June 9, 1959
R. V. HARTY
2,889,565
LIFT BRIDGE
Filed May 4, 1955
9 Sheets-Sheet 4
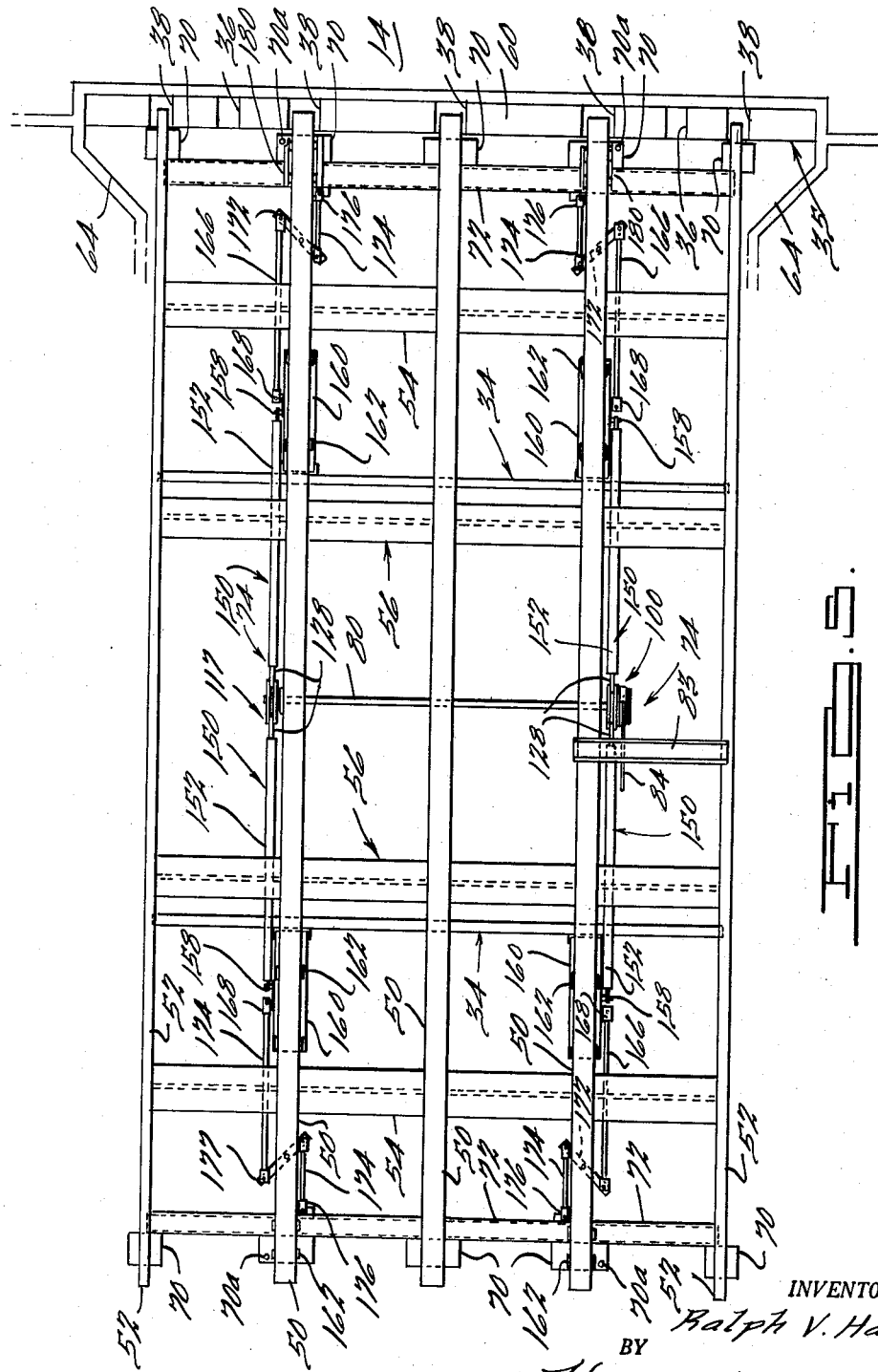
INVENTOR.
Ralph V. Harty
BY
Harness, Dickey, & Pierce
ATTORNEYS.

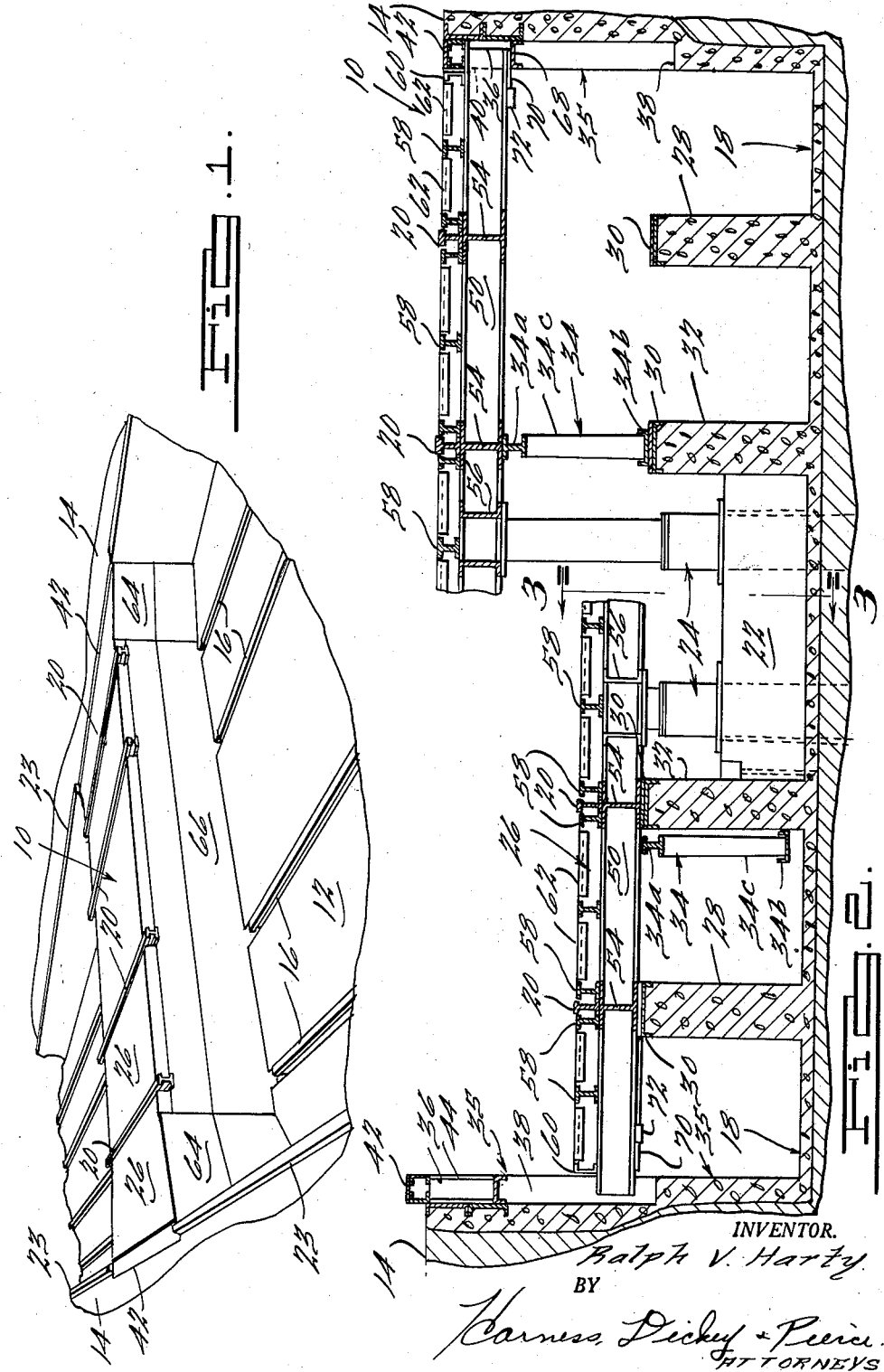

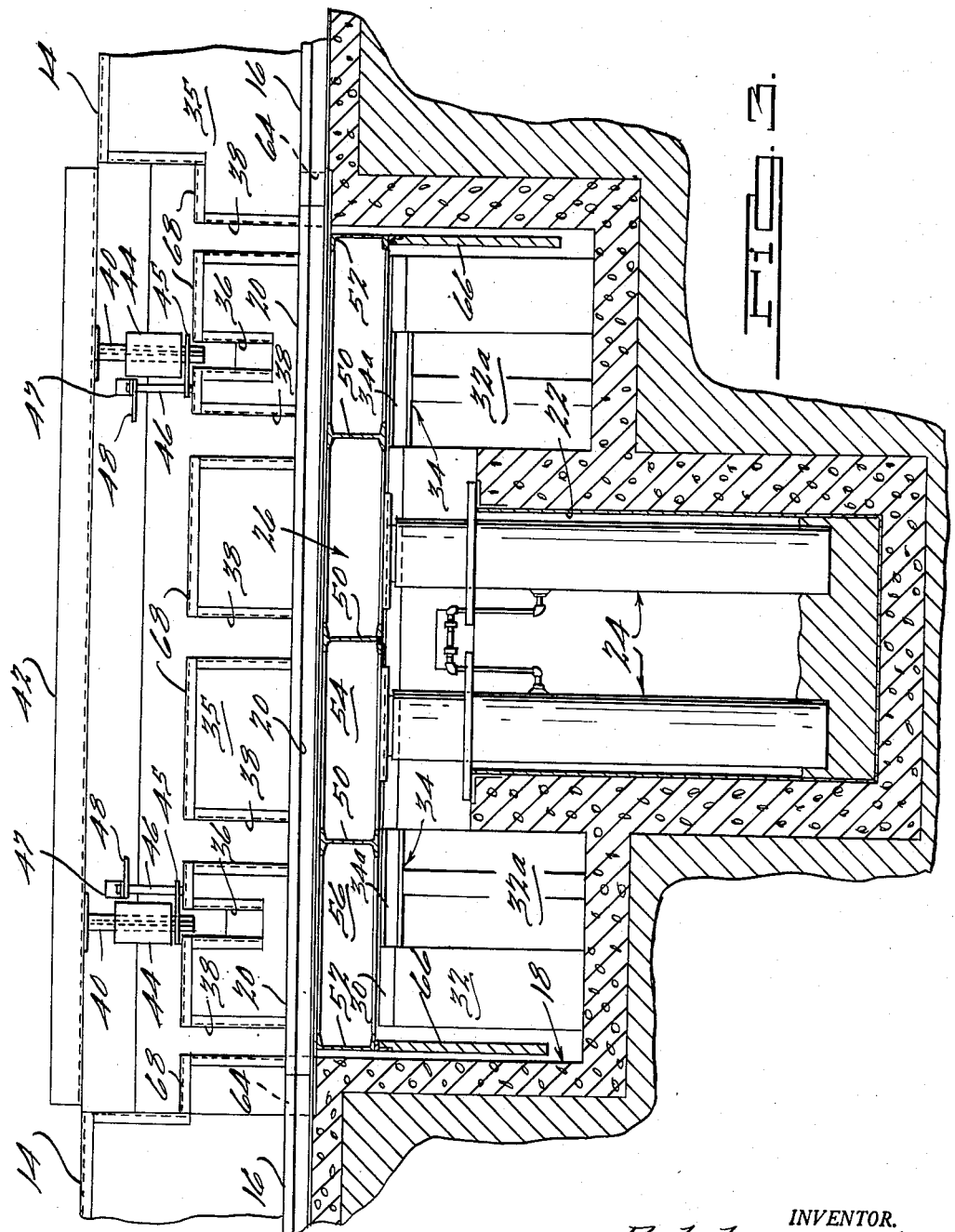

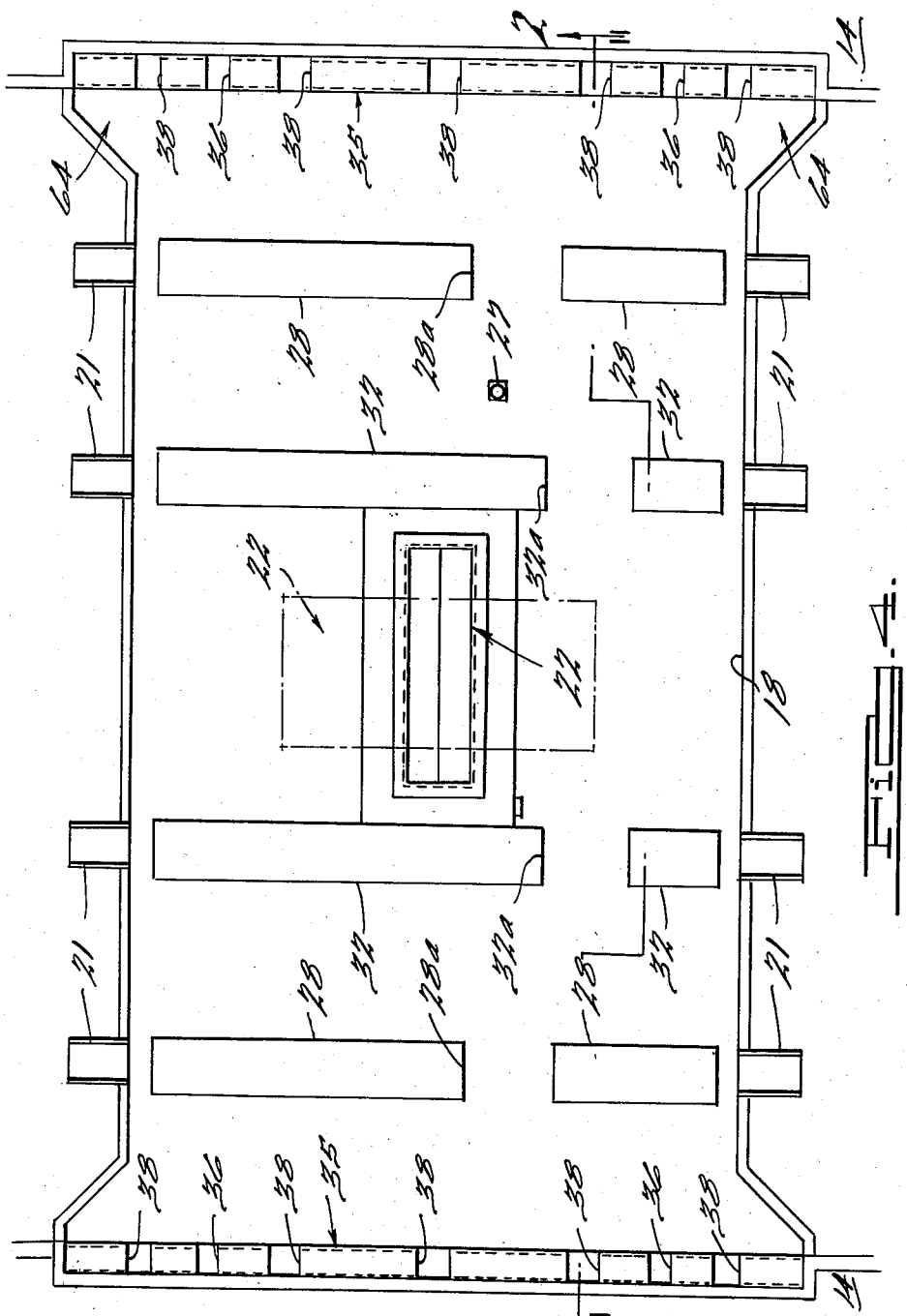

June 9, 1959 R. V. HARTY 2,889,565
LIFT BRIDGE
Filed May 4, 1955 9 Sheets-Sheet 5
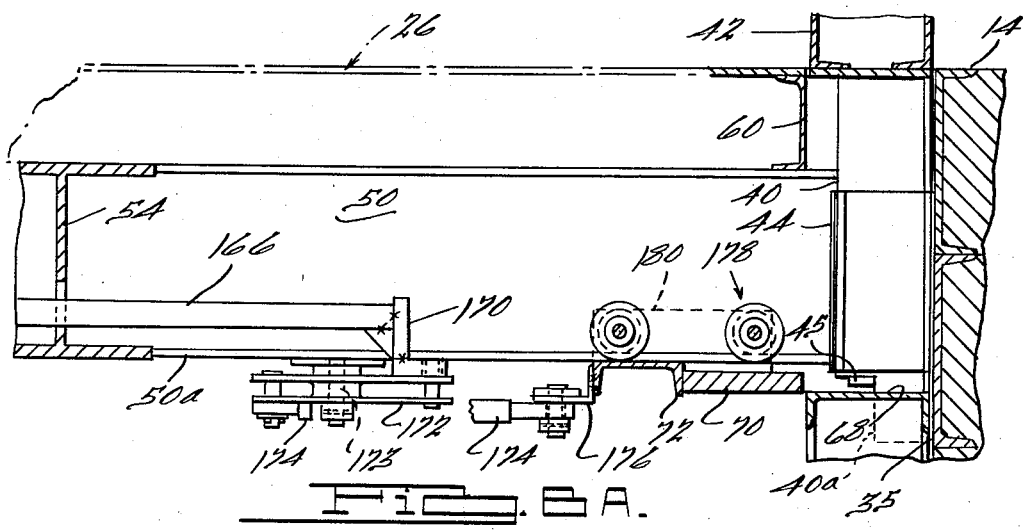
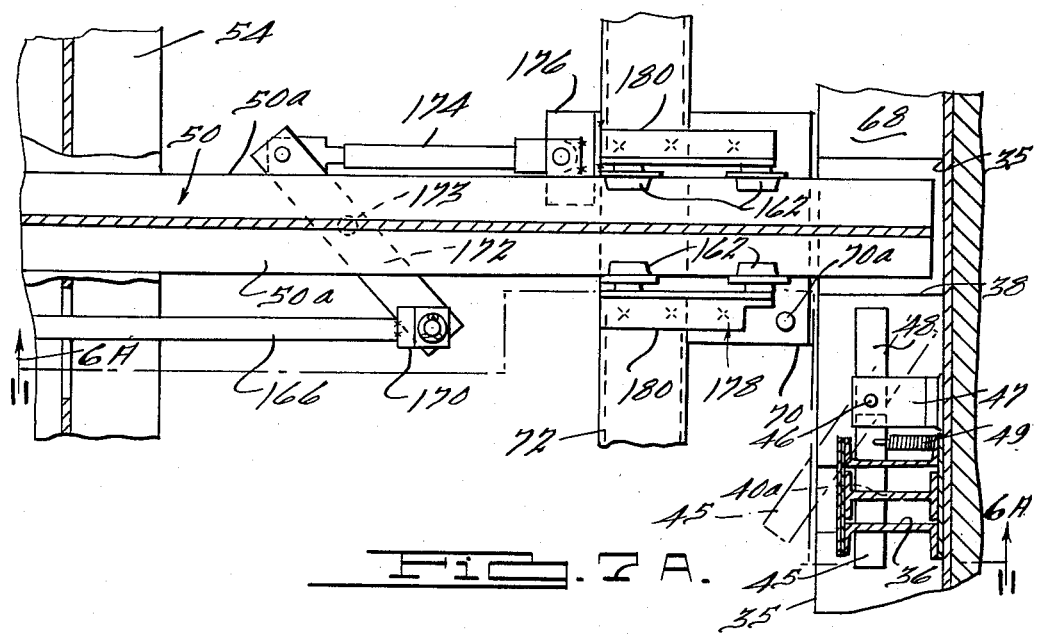
INVENTOR.
Ralph V. Harty
BY
Harness, Dickey & Pierce
ATTORNEYS

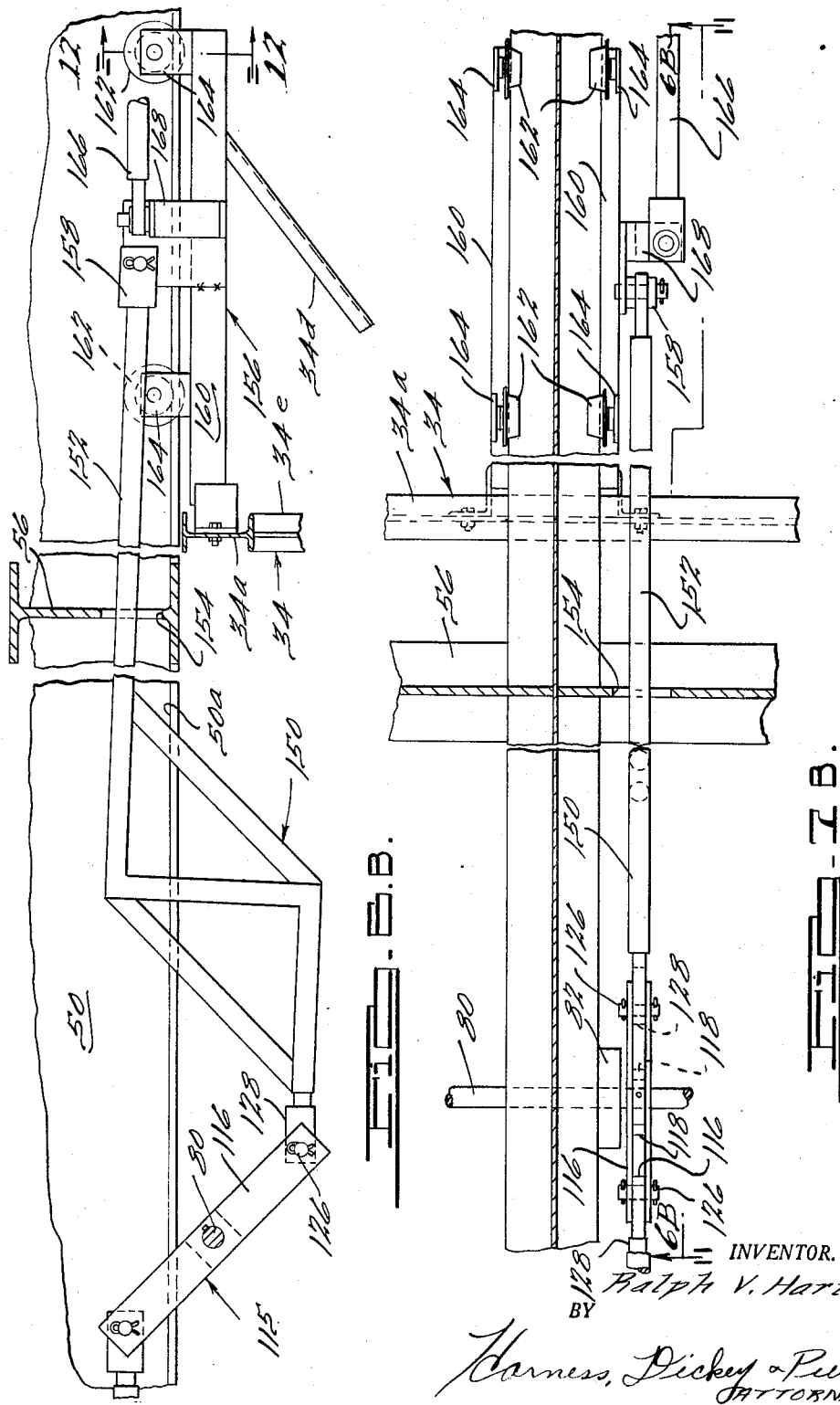

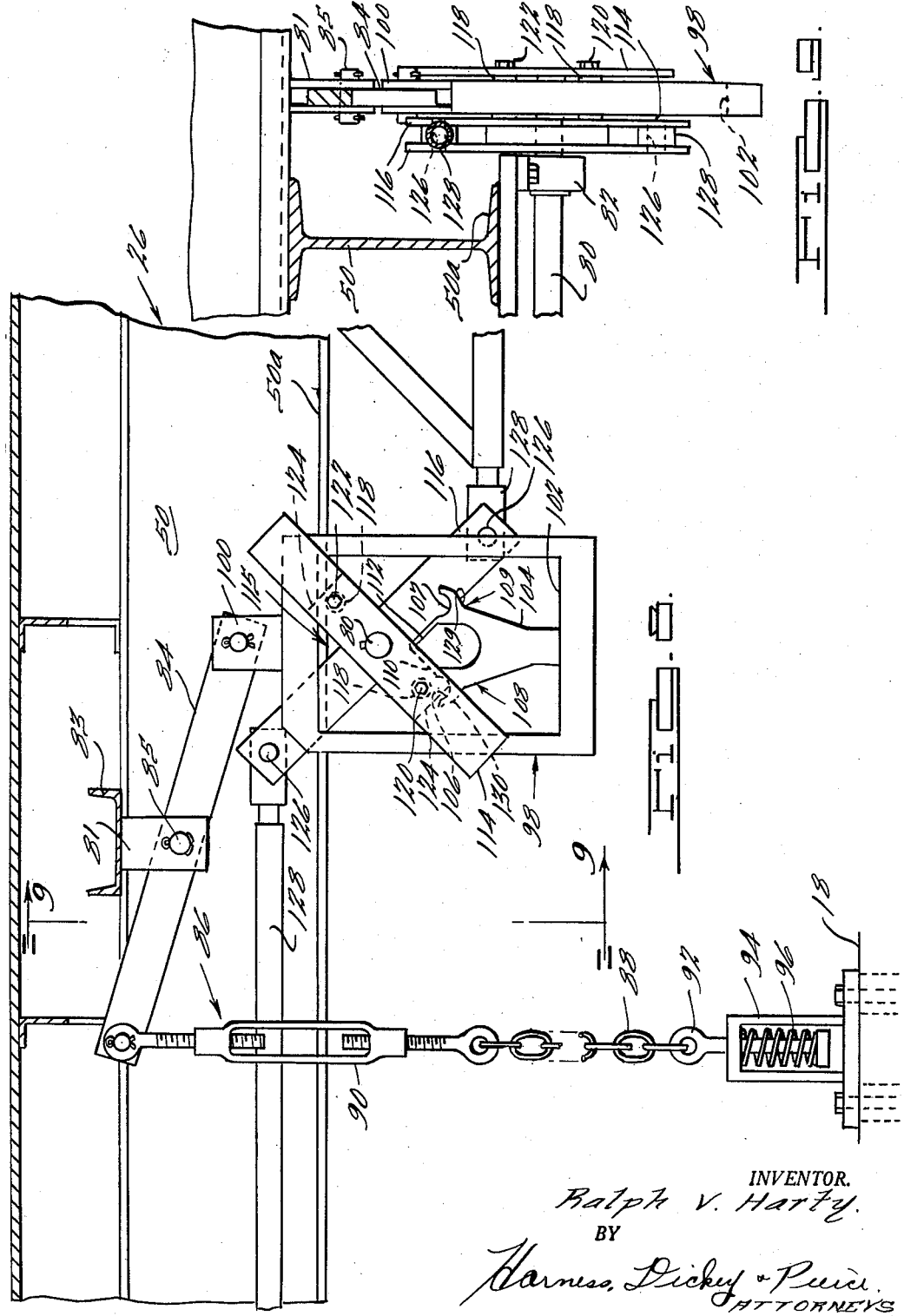

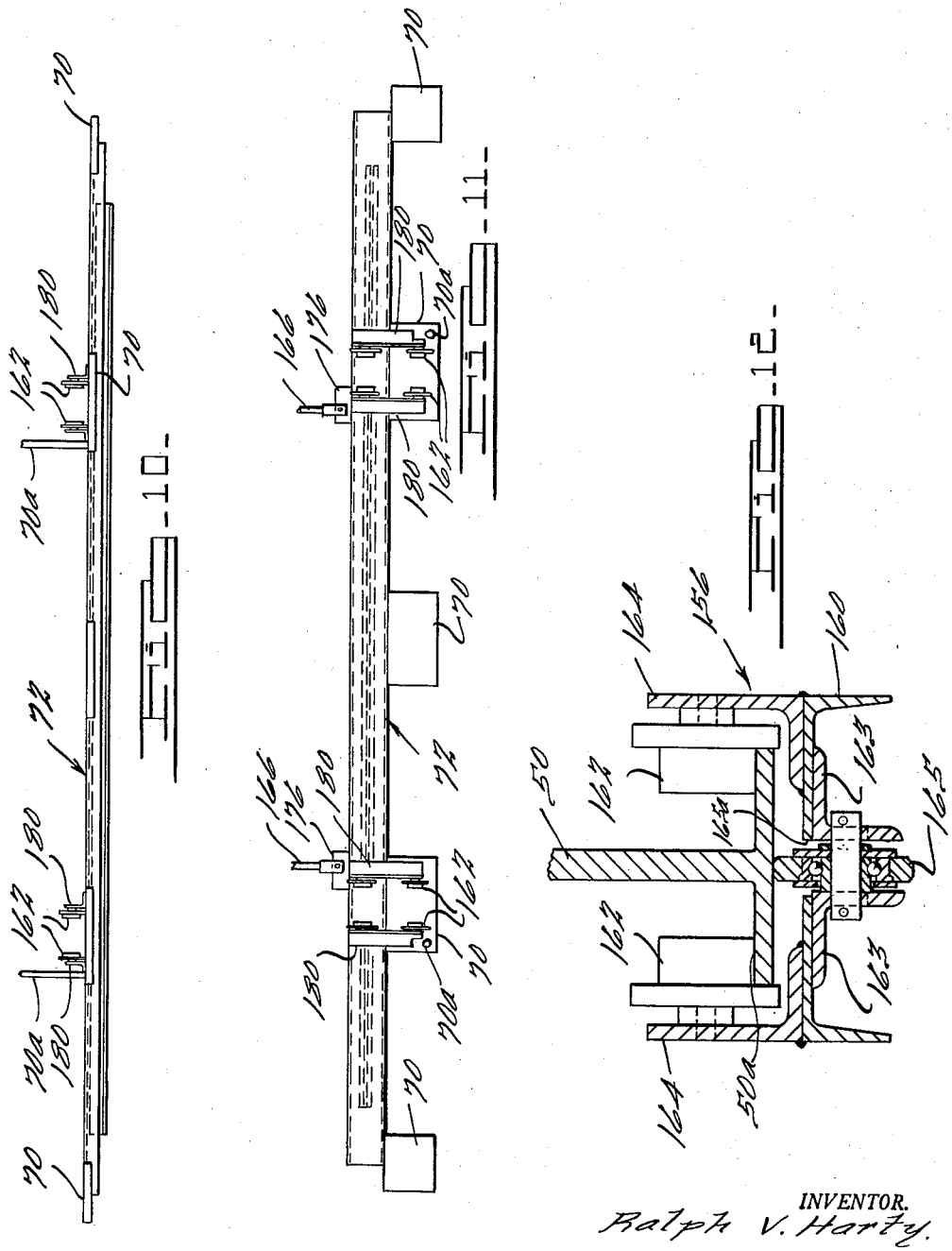

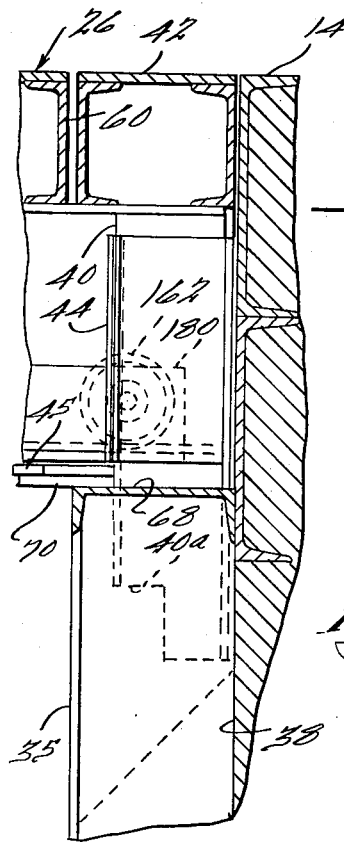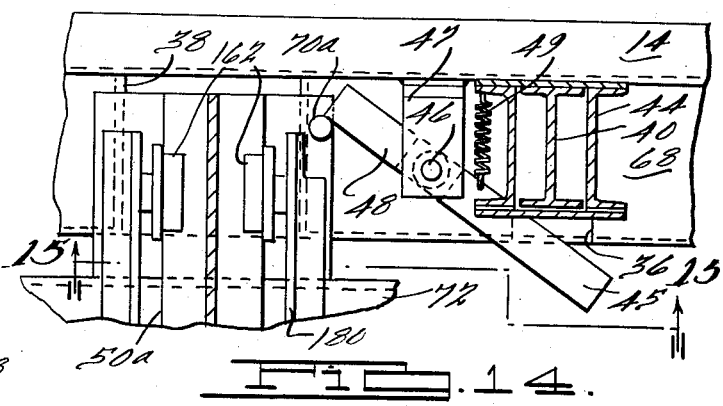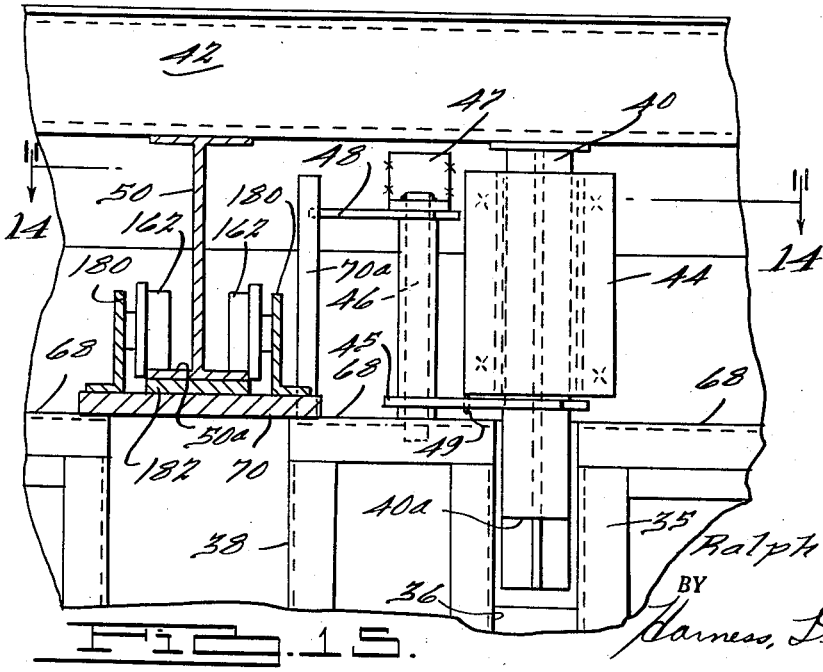

United States Patent Office 2,889,565
Patented June 9, 1959

2,889,565

LIFT BRIDGE

Ralph V. Harty, Detroit, Mich., assignor to R. V. Harty Company, Inc.

Application May 4, 1955, Serial No. 505,907

16 Claims. (Cl. 14—42)

The present invention relates generally to lift bridges and more particularly to a lift bridge adapted for use in connection with railway sidings and spur lines in plant and loading areas where it may be desired to move traffic across a set of railway tracks.

It is among the objects of this invention to provide a lift bridge which is operable between at least two traffic-carrying levels in such a manner to selectively permit traffic to move across the bridge area on either level.

Another object of this invention is to provide a lift bridge which will function to bridge a railway siding or spur line located between two rail car loading docks or plant areas, the bridge permitting traffic between the docks or plant areas without the necessity of circling the length of a line of cars standing on the tracks.

Another object is to provide a lift bridge which will bridge a set of railway tracks permitting rail traffic to move across the bridge on one level and non-rail traffic to move across the tracks on another level.

It is a still further object to provide a lift bridge of the type described having a pair of automatically-actuated barriers at one of its levels to stop traffic when the bridge is lowered below the barrier-equipped level.

Another object is to provide a lift bridge of the type described having a self-actuating linkage system for locking and supporting itself in an elevated position.

Another object is to provide a lift bridge of the character described having mechanical locking means to positively support the bridge at an elevated traffic-carrying position without imposing load on the elevating mechanism, which locking means is actuated by vertical movements of the bridge.

Another object is to provide a bridge of the type described having auxiliary or intermediate supporting means which are actuated into and out of bridge-supporting position by vertical movements of the bridge, these supporting means serving to relieve the lifting means of the load of both traffic and the bridge itself.

A still further object is to provide a bridge of the type described having integrated end-locking and auxiliary supporting means including end-lock means to support the ends of the bridge and auxiliary bridge-supporting frames or members located at intermediate positions on the bridge, with the end-lock and intermediate support members being actuable by a positive-acting mechanical linkage system carried by the bridge and actuated by vertical movements of the bridge.

Still another object is to provide a bridge structure of the type described which can employ inexpensive, low capacity elevating mechanisms because the latter do not support the weight of the bridge and traffic at its elevated position.

Still other objects and advantages will be apparent or will become apparent in the more detailed description of the invention to follow, and in connection with the accompanying drawings, in which:

Figure 1 is a perspective view of the lift bridge of this invention shown installed in a submerged rail siding between two bays or dock or loading surfaces, the bridge being shown in its raised position so that vehicular traffic (trucks, carts, etc.) and pedestrian traffic can cross from one loading dock, bay or plant area to the other;

Fig. 2 is a longitudinal section through the bridge and its pit, the bridge being broken near its center in order to show the left end portion in its lowered or rail car supporting position and the right end portion shown raised into traffic-supporting position, the view showing in particular the flush and raised positions of the end barrier elements, the manner of supporting the bridge in its lowered position, the intermediate support frames which are brought into alignment with support columns in the pit when the bridge is raised and the manner in which the intermediate supports clear their support columns in the lowered position, the hydraulically-operated jacks for raising and lowering the bridge, and the guide members and end support ledge for the bridge ends located in the pit end walls, the section being taken as if along the line 2—2 of Fig. 4;

Fig. 3 is a transverse view in section through the pit and bridge, with the bridge in the lowered position in the pit, showing rail sections mounted in its deck surface and aligned with a set of siding rails to permit movement of rail cars in or out of the siding, and showing in particular a view of one end wall of the pit with its guide members for the vertical travel of the bridge and the disposition of the barrier latch lever members when the barriers are in their raised, locked position, the section being taken generally along the line 3—3 of Fig. 2;

Fig. 4 is a plan view of the pit, with the bridge and barriers removed, showing the guide slots in the end walls for guiding the bridge in its vertical travel, the position in the center thereof of the jack housing, a tranverse supporting boss or column provided near each end of the jack housing for supporting the shiftable intermediate support frames and a second transverse support adjacent each of the end walls to engage the underside of the bridge in its lowered position;

Fig. 5 is a plan view of the bridge with its upper plates and surfacing material removed to show its structural members, the layout of the linkages which operate the sliding lock plates and the shiftable intermediate support frames and their carrier dollies, and the cooperative relation between the end wall slots and the ends of the bridge structure;

Fig. 6A is a fragmentary side elevational view in section of the outer end of one length of the linkage system and its carrier dolly, the view showing the barrier member in its elevated position and the disposition of its latch lever in locking position, the view representing the position of the bridge and its sliding lock plates which they occupy just before the return of the bridge to the pit, the section being taken along the line 6A—6A of Fig. 7A;

Fig. 6B is a side elevational view of the actuating end of one length of the linkage system, with portions broken away and in section, the view showing in particular one of the prop supports and its carrier dolly and the direction reverse mechanism for operating the carrier dolly of the lock bar member shown in Fig. 6A;

Fig. 7A is a plan view of the mechanism shown in Fig. 6A;

Fig. 7B is a plan view of the mechanism shown in Fig. 6B;

Fig. 8 is an enlarged, fragmentary side elevational view of the actuating end of the linkage system, with portions broken away and in section, showing the anchor link and the escapement yoke device which permits movement of the bridge without corresponding movement in the linkage system below dock level and which permits two separate actuation movements of the linkage on consecutive lifts of the bridge above dock level;

Fig. 9 is a side elevational view in section of the escapement yoke mechanism shown in Fig. 8, the section being taken along the line 9—9 of Fig. 8;

Fig. 10 is a front elevational view of one of the lock bar assemblies carried on each end of the bridge, the view showing in particular the disposition of the sliding bridge lock plates and the upstanding pins for actuating the barrier latches;

Fig. 11 is a plan view of the lock bar assembly shown in Fig. 10;

Fig. 12 is a transverse sectional view through the dolly or carrier for one of the intermediate support frames, the view showing in particular the small anti-tip lower roller in contact with lower beam flange and the large upper rollers which roll on the upper surface of the lower flange, the section being taken along the line 12—12 of Fig. 6B;

Fig. 13 is an enlarged fragmentary elevational view in section, similar to Fig. 6A, showing the bridge in the elevated traffic-carrying position with the lock bar dolly or carrier, the lock bar and the sliding bridge lock plates in an advanced position in which the upstanding pins on the lock plates release the barrier latches;

Fig. 14 is a fragmentary plan view in section, showing one of the pin-carrying sliding bridge lock plates actuated into contact with the barrier latch release lever, with the latch lever biased to the unlatched position, the section being taken along the line 14—14 of Fig. 15; and Fig. 15 is a fragmentary elevational view in section of the mechanism shown in Figs. 13 and 14, looking toward the end wall of the pit, with the barrier latch levers withdrawn and the barrier resting on the ends of the longitudinal bridge beams, this view showing in particular the notch in the barrier support plunger which is engaged by the latch lever, the section being taken generally along the line 15—15 of Fig. 14.

Referring now to the accompanying drawings, and especially to Figs. 1 to 4 thereof, the lift bridge 10 of this invention will be seen to be installed in a submerged area or surface 12 between two rail car loading platforms, bays, docks or surfaces 14. Actually, the surface 12 is a submerged rail siding or spur line located inside a factory building, with the surfaces 14 representing the normal first floor level of the building. The siding tracks 16 are brought into the factory building on a submerged level to permit floor level loading. Since the submerged tracks 16 traverse areas of the building or the loading area where it is desired to move other types of traffic across the tracks during car loading or when no cars are on the tracks 16, without necessitating travel of the length of the siding, the bridge 10 of this invention is mounted in a pit 18 located below track level 12 and short transverse rail sections 20 are provided in its upper surface. The rail sections 20 project out beyond the bridge on each side and are supported by concrete buttresses 21 built into the pit side walls (Fig. 4). At its lower position (Fig. 3) the rails 16, 20 form continuous tracks so that rail cars can be moved across the bridge into and out of the plant. At its elevated position shown in Fig. 1, other types of vehicular and pedestrian traffic can move across the tracks from surface 14 to surface 14 for more convenient access to other areas of the plant or for freer movement to various of the cars located on the same tracks or on other sidings paralleling the one shown. It will be clear that while the lift bridge of this invention has outstanding utility in connection with rail sidings, spur lines and loading dock areas, it is to be understood that it is adaptable to any location where it is desired to permit alternate traffic of any kind on two separated levels.

As will be seen more clearly in Figs. 2, 3 and 4, the pit 18 is lined with concrete and has in its bottom a deeper box portion 22 in which is located two air, gas, steam or fluid-operated cylinder and piston units 24, hereinafter referred to as jacks, for lifting and lowering the deck structure 26 of the bridge vertically in and out of the pit. The jacks 24 can be disposed longitudinally of the bridge as shown in Fig. 2 and in solid outline in Fig. 4, or transversely as shown in Fig. 3 and in dotted outline in Fig. 4, or four such jacks disposed in a rectangular pattern can be employed, if desired. The pit has a drain 27 to remove water should any get into the pit. Also, as best shown in Figs. 2 and 4, the pit 18 is provided near each end with an upstanding, wall-like bridge rest abutment 28 to support the bridge ends when the bridge is lowered into the pit. The abutments 28 are provided with an access opening 28a (Fig. 4) to provide access to all parts of the pit and with metal caps 30 (Fig. 2) to protect the concrete of the abutments against chipping.

Inside each of the abutments 28 is a second of a pair of abutments 32 having access openings 32a (Figs. 3 and 4) and caps 30. When the bridge 10 is raised an auxiliary or intermediate support frame 34 (Fig. 2) comes to rest on the top of each of the abutments 32, the bridge having to be first lifted above its traffic-carrying level and then lowered to place the frames in their weight-supporting position. The latter position is clearly shown at the right in Fig. 2. The intermediate support frames 34 are shifted slightly, when the bridge is again raised and lowered, to assume a position alongside the abutments 32 as is clearly shown at the left in Fig. 2. The intermediate support frames 34 are rectangular in shape and are composed of top I-beam members 34a, bottom channel member 34b and small vertical I-beam members 34c welded into a unitary frame. Such frame is diagonally braced to its carrier supports or dollies by means of slanting braces 34d (Fig. 6B). The actuating linkage mechanism for the frames 34 will be described later on herein.

As will be seen most clearly in Figs. 4 and 5, each of the end walls 35 of the pit is provided with a number of slots formed of structural steel members embedded in the concrete of the pit end wall. Five of the slots on each end wall, identified by the numeral 38, extend down the end wall for the entire depth of travel of the bridge and serve as guides which receive the ends of the bridge deck members. Two other slots, identified by the numeral 36, are provided in the end wall but are not as deep. The slots 36 receive the plungers 40 of a barrier member 42 (see Fig. 3). The plungers 40 are short I-beams mounted in metal guide brackets or slide guides 44 secured above the slots 36. The lower end of each plunger is cut away to form a notch-like shoulder 40a, the purpose of which will appear below.

Associated with each barrier support plunger 40 is a latch lever 45 which is attached to a shaft 46 mounted in a bracket 47 alongside the barrier slide guide 44. Attached to the upper end of shaft 46 is an actuating lever 48 which extends over adjacent one of the slots 38 to make contact with a pin 70a carried by a sliding bridge lock plate 70 to be described below. The latch lever 45 is provided with a spring 49 so as normally to be urged into the notch 40a to lock the barrier in its erect position when the bridge is down in the pit 18. When erect the barriers 42 prevent trucks or other vehicles from being driven into the submerged rail track area, the barriers actually forming a continuation of a continuous barrier 23 located along the top edge at each side of the siding.

The deck structure 26 is shown in greater detail in Fig. 5 with its surfacing material removed to reveal its structural frame members and the actuating linkage carried thereby. The deck comprises three heavy longitudinal I-beams 50 and two lighter outer channel side members 52 cross-braced by a number of transverse heavy I-beams 54 and near the center by two heavy box members 56 which are engaged by the jacks 24 (Fig. 2). On top of the basic framework thus described, smaller I-beams 58 and end channels 60 are laid across the members 50, 52 and filled in with stiffener plates 62 to form a support grid for metal deck plates of the anti-slip variety secured thereacross. The rails sections 20, it will be noted, are laid directly above the heavier transverse members 54.

As will be noted in Fig. 5, the end of the deck surface is flared at each side of each end at 64 to give a slight turning radius to facilitate turning of vehicles onto and off of the bridge. Not shown is an access door in the deck surface to permit entry to the pit for inspection and servicing of the machinery and connections located therein. As will be seen in Figs. 1 and 3, the bridge is provided on each side with a long safety skirt or guard 66 of sheet metal or plate which is sufficiently long to extend into the pit at the highest elevation of the bridge to prevent foreign objects from being caught under the bridge when it is lowered.

At each end of the deck structure 26 the longitudinal structural members 50, 52 project outwardly a short distance to fit into the slots 38. There preferably should be no actual contact, however, between the slots 38 and the members 50, 52 in order to prevent binding and sticking, the bridge being balanced on the spaced-apart jacks 24. As will be best seen in Fig. 3, each end wall of the pit 18 is provided with transverse, horizontal structural metal members 68 extended across between the top ends of slots 36, 38 and embedded in the concrete to form a shelf or ledge on which the bridge is supported by a plurality of sliding lock plates 70 carried by a transverse lock bar 72 (see detail, Figs. 10 and 11) at each end of the deck structure 26. The lock bars 72 are projected outwardly by a linkage system indicated generally by the numerals 74 in Fig. 5. This same linkage system actuates the intermediate support frames 34 into and out of alignment with their columns 32. Two of the lock plates carry an upstanding pin 70a for engagement with the actuating levers 48 of the barrier latching mechanisms. Thus, when the lock plates are extended the barriers 42 are released and when the lock plates 70 are retracted the barrier latch levers 48 are released so the levers 45 can engage the notches 40a to support the barriers in a raised position above surface 14.

*Bridge lock linkage system*

Figs. 6A, 6B, 7A, 7B, 8 and 9 illustrate the actuating linkage system 74 in considerable detail. As will be seen in Figs 5 and 9, a shaft 80 is journalled transversely of the deck structures in bearings 82 secured to the underside flange 50a of the longitudinal I-beams 50. As will be seen, the shaft 80 actuates one side of the linkage system. A short channel brace 83 (Figs. 5 and 8) is secured across members 50, 52 to serve as a support member for the escapement device of the linkage system. Secured to the underside of member 83 (Fig. 8) is a clevis bracket 81 which carries a pin 85 on which is mounted a pivot lever 84. Secured to one end of the lever 84 is an anchor link 86, the latter comprising a chain 88, a turnbuckle 90, and an eye-bolt 92 secured in a plunger type anchor bracket 94 with a spring 96 disposed about the enclosed length of the eye-bolt to ease the shock of loads applied to the anchor link 86. The anchor bracket 94 is securely bolted to the floor of the pit. Thus mounted, upward movement of the bridge pivots lever 84 downwardly about pin 85. The length of the anchor link 86, of course, is adjusted by means of the turnbuckle 90.

On its other end, the pivot lever 84 carries a rectangular escapement yoke frame 98 pivotally secured thereto in a clevis fitting 100 so as to dangle freely therefrom. On the bottom horizontal member 102 of the frame 98 there is rigidly secured an upright, fork-like pivot shifter member 104 having hollows or depressions 106, 107, respectively, on its arms 108, 109. Between the two arms 108, 109 two slanting surfaces 110, 112 are brought together at a point. More will be said below about the function of the pivot shifter 104.

A unitary X-shaped lever member 115 is keyed to shaft 80 so as to fit about or enclose the yoke frame 98, as is best shown in Fig. 9. The X-lever 115 is formed of 2 pairs of flat plates 114, 116, the plates 114 being secured together by spacers 118 and bolts 120, 122. One of the plates 116 passes through one of plates 114 (one in rear in Fig. 8) and is welded therein. The bolts 120, 122 are extended through the rear plate 114, through a second set of spacers and through a bracket plate 124 (Fig. 8) in which the rearmost plate 116 is welded. The plates 116 are secured together at their ends by pins 126 on each of which is pivoted a push rod 128 connecting with each leg of the linkage system on the one side. A pair of plates 117 attached to the other end of shaft 80 produces corresponding movements in the linkage on the other side of the bridge.

The escapement yoke mechanism comprising the yoke frame 98 and the X-lever 115 is shown in Fig. 8 in the normal position it occupies when the bridge is down in the pit. As the bridge moves upwardly the slack is first taken out of the anchor link 86 and the lever 84 then begins to pivot down causing the yoke frame 98 to start to rise. After considerable vertical movement has occurred the depression 106 in left-hand arm 108 of the pivot shifter 104 engages the spacer 118 about bolt 120 causing the X-lever member 115 to rotate in a clockwise direction, this latter rotation being imparted to shaft 80 to cause it to rotate in a similar direction. As the bridge continues upwardly past the level of surfaces 14 (Fig. 1) to the level of the raised barriers 42 the X-lever 115 will continue to rotate until it has pivoted approximately 90 degrees, at which point the push-rods 128 will have been pulled inwardly to push the lock bars 72 outwardly and position the sliding bridge lock plates 70 over the slots 38 and the members 68 embedded in the pit end walls, at the same time releasing the barrier latch levers 45. In this pivotal movement the arm 108 of pivot shifter 104 will have described an arcuate path about shaft 80 causing the slanted surface 112 of the pivot shifter 104 to be presented to shaft 80. In this way the frame 98 will be caused to pivot in the clevis 100 insuring clearance for the bolt 122 (at the other end of the arm) to clear arm 109 and assume a position below a tapered shoulder 129 therein.

The outward movement of the lock plates 70 brings a pin 70a by each of two of the lock plates 70 adjacent each of the barrier plungers 40 and into contact with the actuating lever 48 of the barrier latch mechanism, thereby pivoting the latch levers 45 out of contact with the plungers 40. When the bridge has reached its limit of upward travel the barriers 42 are supported on the ends of the deck members 50, 52 so that the latch levers 45 can be withdrawn in this fashion.

With the bridge in its uppermost position the X-lever member 115 will have pivoted to place the bolt 122 underneath arm 109 in a position below the tapered shoulder 129 formed in the outer surface of arm 109. When the bridge and barriers are subsequently lowered to a position level with surfaces 14 the bolt 122 will snap past the arm 109, the pivotal suspension of yoke frame 98 allowing it to pivot sidewardly to allow this to happen. As the bridge is lowered to the level of surfaces 14 no movement occurs in the push rods 128 and the plates 70 will remain in bridge-locking position to support the ends of the bridge on ledge members 68.

When it is desired to lower the bridge into the pit once again it must first be elevated to raise the barrier 42 into their raised position above surfaces 14. As the bridge starts to move up again from the level of surfaces 14 the bolt 122 is engaged in hollow 107 in arm 109 of the pivot shifter 104. Upon continued upward movement, the X-lever member 115 is pivoted in a counterclockwise direction until at maximum bridge elevation it will have pushed the push rods 128 outwardly, fully retracting the lock plates 70 and releasing the barrier latch levers 45 which become engaged under the shoulder 40a on each plunger 40. In this position the bolt 120 will be below the shoulder 130 in the arm 108 of pivot shifter 104. As the bridge starts its downward movement toward the pit the barriers 42 remain erect and the bolt 120 will snap past the arm 108 to disengage the pivot shifter 104. As the bridge continues to move down into the pit 18 the yoke frame 98 moves down without causing corresponding movement in the push rods 128.

The X-lever 115 of the escapement device described above moves the push rods 128 in the manner described on the one side of the bridge. The corresponding rotation of shaft 80, which is keyed to the plates 117, produces a corresponding movement in the push rods 128 mounted on the other side of the bridge. Thus, the linkage system on each side of the bridge is substantially identical. Likewise, the linkage members connected on each side of the X-lever 115 and plates 117 are substantially identical. For these reasons the levers and linkages extending in only one direction from X-lever 115 are shown in detail in the drawings.

As shown in Fig. 6B, the member 116 of X-lever 115 is pivotally secured to push rod 128, the latter having rigidly attached thereto a parallelogram shaped frame 150 which extends up to pass alongside the I-beam 50. The upper member 152 of the frame 150 is extended through a slot 154 in transverse frame member 56 to be pivotally connected with a dolly 156 by means of a push rod bracket 158. The dolly 156 comprises a rectangular frame comprising bottom channel member 160 (see Fig. 12) secured on one end to the intermediate support top frame member 34a. Secured at each end of each side of member 160 is an upstanding bracket 164 in which is mounted a roller 162. The rollers 162 rest on the lower flange 50a of the longitudinal I-beam 50 so as to roll freely thereon. To the underside of one end of the member 160 there is welded a pair of small angle brackets 163 (Fig. 12) in which is mounted an anti-tip roller 165 which extends through a cutout 165a in member 160 to contact the bottom side of the flange 50a. Thus provided, the dolly carrier 156 can not tip, lock or bind when pushed or pulled by the linkage lever 152 and smooth operation is assured. Since the push rod bracket 158 is a pivot type the linkage frame member 150 can pivot slightly with rotary movements of the plates 116 without tipping the dolly carrier 156. Since each of the support frames 34 is attached rigidly at each side of the bridge to one of the dolly carriers 156, movements of the linkage system move it into and out of alignment with the supporting abutments 32 in the pit.

A second push rod 166 is pivotally secured to the support frame dolly carrier 156 on an upstanding bracket 168 and extended over through a cross frame member 54 to a point near the end of the bridge where it is rigidly attached to a clevis bracket 170 (Fig. 6A). Secured in the clevis bracket 170 is a pair of reverse direction levers 172 pivoted on a pin 173 fixed in the center of the underside of lower flange 50a of member 50. Pivotally attached to the other end of reversing levers 172 is a third, short push rod 174 which is pivotally attached at its other end to a bracket 176 attached to a short lock bar carrier dolly 178. Like the intermediate support carrier dolly 156, the lock bar carrier dolly 178 has four rollers 162 attached to upstanding angle side members 180. The lock bar channel 72 is rigidly attached across the underside of side members 180, with a rub-rail 182 (Fig. 15) secured to flange 50a interposed therebetween. The lock bar 72 is supported on a dolly 178 on each side of the bridge so as to be reciprocably moveable toward and away from the pit end wall 35 according to the actuating movements of the push rods 174 on each side of the bridge.

As will be seen most clearly in Figs. 10 and 11, the sliding bridge lock plates 70 are rigidly welded to the leading side of the lock bar 72 so as to project outwardly therefrom. The dolly side frame members 180, in turn, are secured atop the plates 70 to form a rigid frame. As appears most clearly in Figs. 10 and 15, the barrier actuating pin 70a is secured in one corner of the plate 70 in an upright position. As described above, the lock bars 72 are actuated in and out of contact with the barrier latch levers 48 and the ledge members 68 by elevational movements of the bridge itself.

The bridge described above is capable of supporting the extremely heavy weight of loaded freight cars passing over the rail sections 20 when the bridge is at the bottom of the pit and supported on the abutments 28, 32 and with the ends of beam members 50, 52 on the bottoms of slots 38. In this position the jacks 24 bear no part of the weight of the bridge or the traffic load and need not, therefore, be of excessively heavy construction. Likewise, when the bridge is elevated to its position level with dock surfaces 14, the load of the bridge and the weight of traffic passing thereover is borne by the ends of the longitudinal members 50, 52 (lock plates 70 resting on ledge member 68) and by the two full width intermediate support frames 34 resting on the abutments 32. The jacks 24 bear only the load of the deck structure itself and the barriers while the bridge is being raised and lowered. As a result, the jacks 24 can be of lighter weight construction and smaller in size than would otherwise be required. Likewise, the pumps, valves, controls, etc. are smaller, simpler in design and less expensive than they otherwise would be.

The mechanical linkage system, operated by movements of the bridge itself, is remarkably simple and positive in operation. It affords no opportunity for lack of synchronism between bridge movements and the locking of the barriers and insures the positive erection of the barriers at all times when the bridge is lowered below dock level. Likewise, the linkage system always ensures the positive placement of the intermediate support frames to support the bridge. Simple sequence controlling means can be provided to insure the proper sequence of bridge movements above dock level to pick up, and disengage from, the barriers so that the bridge can be operated by single control button. The linkage system itself requires little maintenance and is susceptible of easy inspection, adjustment and repair.

The use of the lift bridge of this invention facilitates traffic flow in plant and loading dock areas and makes possible full utilization of a number of intersecting traffic lanes. Since the bridge has to be lowered into the pit only when freight cars or other types of traffic are moved on the one level, the bridge is normally left in the elevated position and it is not necessary to shuttle it back and forth between levels.

What is claimed is:

1. A lift bridge comprising a deck structure moveable in a vertical direction, deck structure supporting abutment means located in cooperating structure at each end of the bridge, means for lifting and lowering the deck structure, a barrier member at each end of the deck structure, which barrier members are moveable in a vertical direction between an elevated barrier position and a lowered non-obstructing position, retractable co-acting supporting means carried by the deck structure for engaging with said abutment means at each end of the bridge to support the bridge in a raised traffic-supporting level, means including a linkage system carried by said deck structure for actuating said retractable supporting means, means on said deck structure for engaging said barrier members to lift them to barrier position, and latching means to support said barrier members in the lifted barrier position, said last-named means being actuated by said linkage system to permit the lowering of said barrier members with said deck structure.

2. A bridge as defined in claim 1 wherein said deck structure supporting abutment means include members fixed in surrounding structure, the retractable supporting means carried by the bridge structure includes bridge lock members slidably carried on each end of the deck structure, and said linkage system is adapted both to slide said members into position in contact with said fixed members and to withdraw them again, all in response to movements of the deck structure above the traffic-supporting level.

3. A bridge as defined in claim 1 wherein said barrier members are supported on plungers in guides located in said surrounding structure, said latching means includes spring loaded levers normally urged into barrier supporting contact with said plungers, and said levers are arranged to be moved in opposite directions by successive movements of said deck structure above its traffic-supporting level whereby said barrier is latchable in lifted position in response to one such movement of the deck structure above said level and the latching means is releasable in response to a subsequent such movement.

4. A lift bridge comprising a deck structure moveable in a vertical direction, abutment means for supporting the deck structure located in surrounding structure at each end of the deck structure, means for lifting and lowering said deck structure, and a bridge-locking mechanism carried by said deck structure, said mechanism comprising a system of push rods extending toward both ends of the deck structure from an intermediate position therein, a dolly suspended from the deck structure at each end of the bridge and connected to one of said push rods so as to be reciprocally moveable thereby, a lock bar attached to the dolly at each end of the bridge, a support member carried by each of said lock bars and adapted to engage the said abutment means to support said deck structure at a traffic-supporting level, and means including an anchor means affixed independently of said deck structure so as to actuate said push rod system upon vertical movements of said deck structure.

5. A bridge as defined in claim 4 wherein a barrier member is provided at each end of the bridge and each is slidably supported on plungers mounted in guides in surrounding structure for vertical movement, each said barrier member is provided with a spring-loaded latch lever normally biased into barrier-locking contact with one of said plungers and said support members on said lock bars are adapted to bias said barrier latch members out of engagement with said plungers upon movement of said deck structure above its traffic-supporting level.

6. A lift bridge comprising a deck structure moveable in a vertical direction, guides in surrounding structure at each end of said bridge for guiding the vertical movements of the deck structure, means for lifting and lowering said deck structure, a lock bar slidably carried at each end of said deck structure, means on said lock bars for engaging said surrounding structure to support said deck structure at a traffic-supporting level, a system of rods carried by said deck structure for actuating said lock bars into and out of locking position and including a link anchored to surrounding structure for actuating said rods according to the vertical movements of said deck structure, a barrier member mounted at each end of said bridge, plungers slidably guided in surrounding structure and carrying said barrier member, latch members movable to and from a supporting position in under-engaged relation to at least a portion of each of said plungers and in such position holding said plungers and thereby the barrier members in an elevated position when said deck structure is lowered below traffic-supporting level, means biasing the latch members to said supporting position, means carried by said lock bars for actuating said latch members out of said supporting position whereby said barriers can be lowered, and means on said deck structure for supporting said barriers during lowering thereof.

7. In a lift bridge the combination comprising a deck structure moveable in a vertical direction, a system of rods carried by the deck structure and extending in both directions toward each end of the bridge from an intermediate point therein, an anchor means connected to said rod system at said intermediate point for actuating said system of rods according to vertical movements of said bridge, a dolly slidably suspended from the bridge near each end of the bridge and connected to the rod system, a lock bar secured to each said dolly, and a yoke means connecting said anchor means to said rod system to actuate said lock bars carried by said dollies into and out of locking engagement with surrounding structure at each end of the bridge at a traffic-carrying level.

8. In a lift bridge the combination comprising a deck structure moveable in a vertical direction, a system of rods carried by said deck structure and extending in both directions toward each end of the bridge from an intermediate point therein, an escapement yoke connecting the rods extending in both directions, a link means anchored at one end to surrounding structure and connected at its other end to said yoke in order to cause the latter to actuate said rod system according to vertical movements of said deck structure, a dolly supported by said deck structure on each side of the said intermediate point for rolling movement relative to said deck structure and each connected individually to the rods extending in that direction, a rigid frame member attached to each said dolly, and a supporting-structure under said bridge adjacent each said rigid frame, said rod system, said yoke and said link being adapted to cooperate to move said dollies so that the frame members carried thereby are moved into alignment with their respective supporting structures to support said bridge at an elevated position, upon movement of said deck structure above said last-named position, and to move the said frame members out of alignment with said supporting structures to permit lowering of said bridge upon a subsequent vertical movement of said deck structure above said elevated position.

9. In a lift bridge the combination comprising a deck structure moveable in a vertical direction between lower and upper traffic-supporting levels, a rod-like linkage system carried by said deck structure and having a link thereof anchored to surrounding structure so as to be actuated by vertical movements of the deck structure, a barrier member mounted at each end of the bridge at one of said levels on plungers mounted in a cooperating structure, means on said deck structure for lifting and supporting said barrier members above the said one traffic-supporting level, spring-loaded latch levers normally contacting said plungers to hold said barrier members elevated when said deck structure is subsequently lowered below the said raised barriers, and means connected to said linkage system to contact said barrier latch levers and move them out of contact with said plungers when said deck structure again is moved vertically above the said one traffic-supporting level to permit said engaging means of said deck structure to again support said barrier members.

10. In a lift bridge having a deck structure vertically moveable between at least two levels, means for lifting and lowering said deck structure, and means located in a cooperating structure for supporting the ends of said bridge at at least one of said levels, the combination comprising a linkage system, carried by said deck structure and extending longitudinally in both directions from a point intermediate the length of said bridge, and including an anchor link anchored on one end independently of said deck structure and connected on its other to one end of a pivot lever suspended from said deck structure at said intermediate point, an escapement yoke member pivotally suspended from the other end of said pivot lever, a lever system fixedly mounted for rotation on said deck structure, a pivot shifter member affixed to said yoke member, and a pin affixed to each of opposite ends of said lever system, said pins being so positioned as to be engaged alternately by said pivot shifter member on successive vertical movements of said yoke member, and the engagement of said shifter member with each said pin being effective to rotate said lever system in opposite direction relative to said yoke member, the members of said linkage system being connected to opposite ends of said lever system so as to be reciprocated by rotative movements of the latter, and said linkage system being actuated through said anchor link by vertical movements of said deck structure, and means attached to said linkage members for engaging said supporting means in said cooperating structure at said one level.

11. The combination of claim 10 wherein a support frame is attached to said linkage system on each side of said intermediate point so as to be reciprocated in opposite directions longitudinally of said bridge deck structure, each of said support frames being adapted to be aligned by said linkage system to rest on a support located below said deck structure intermediate the center and ends of said bridge by the movement of said linkage system in one direction, and to be shifted by said linkage system to clear the said support and allow said deck structure to be lowered by the return movement of said linkage system, a complete cycle of reciprocating movement of said linkage system being produced by two successive vertical movements of said deck structure above said one level.

12. In a lift bridge, a deck, means for moving the deck vertically between a raised position and a lowered position, said raised position being below the extreme upper limit of movement of the deck, whereby a degree of overtravel of the deck is permitted between said raised position and said upper limit, a mechanical bridge support movably actuatable to and from a released position and a holding position, in the latter of which positions it is effective to prevent movement of the deck downwardly from said raised position but does not oppose upward movement of the deck from said raised position, unidirectional operating means responsive to overtravel of the deck for moving said support between said released position and holding position, and sequencing-reversing means operatively interconnected with said operating means and said support for reversing the direction of movement imparted to said support in response to successive overtravel movements of the deck.

13. In combination with a bridge as defined in claim 12, a guard movable between an obstructing protective position and a retracted position with respect to a crossing area served by the bridge, and means operatively interconnecting said guard and said sequencing-reversing means to position said guard in said obstructing position while said support is in released position and to position the guard in said retracted position while said support is in holding position.

14. In combination with a bridge as defined in claim 12, a guard movable to an obstructing protective position with respect to a crossing served by the bridge in response to upward movement of the deck above the raised position toward said upper limit and movable to a retracted position with respect to said crossing in response to downward movement of the deck between the upper limit and said raised position, and guard locking means actuated by movement of said bridge support, said guard locking means being movable in one direction to a locking position in response to each actuation of the bridge support away from said holding position, in which locking position said guard locking means maintains said guard in the protective position despite such downward movement of the deck, said guard locking means being movable to a released position in response to movements of said bridge support to said holding position, whereby said guard may move to retracted position in response to each alternate overtravel movement of the deck.

15. A bridge construction as defined in claim 12 including a plurality of such movable supports carried by the deck and spaced therealong in a direction longitudinal with respect to a crossing served by the bridge, one of said supports located intermediate the length of the deck comprising a substantially vertical depending pier section movable to such released and holding positions, a fixed pier section located beneath said movable pier section in alignment with the position occupied by the latter when in holding position.

16. In a lift bridge construction, in combination with a substantially horizontal deck structure movable in a vertical direction from one to another of two vertically spaced rest positions, rigid stationary abutment means located at each end of the deck structure in positions corresponding to one of said rest positions, means for vertically moving the deck structure from one to the other of said rest positions and for moving said deck structure through a substantial overtravel above the upper of said rest positions, interlocking means carried by the deck structure and operably movable to and from overengaging relation with respect to said abutment means in response to vertical movements of said deck structure, and means responsive to such overtravel movement of the deck structure for actuating said interlocking means.

References Cited in the file of this patent

UNITED STATES PATENTS

| | | |
|---|---|---|
| 227,125 | Peterson | May 4, 1880 |
| 488,838 | Rowland | Dec. 27, 1892 |
| 554,767 | Brooke et al. | Feb. 18, 1896 |
| 692,386 | Ten Broeke | Feb. 4, 1902 |
| 1,152,318 | Howarth | Aug. 31, 1915 |
| 2,640,436 | Homes et al. | June 2, 1953 |
| 2,652,783 | Skinner | Sept. 22, 1953 |
| 2,718,851 | Holdman | Sept. 27, 1955 |

UNITED STATES PATENT OFFICE

CERTIFICATE OF CORRECTION

Patent No. 2,889,565  June 9, 1959

Ralph V. Harty

It is hereby certified that error appears in the printed specification of the above numbered patent requiring correction and that the said Letters Patent should read as corrected below.

Column 6, line 40, after "70a" insert -- carried --.

Signed and sealed this 8th day of March 1960.

(SEAL)
Attest:
KARL H. AXLINE
Attesting Officer

ROBERT C. WATSON
Commissioner of Patents